Figure 1:
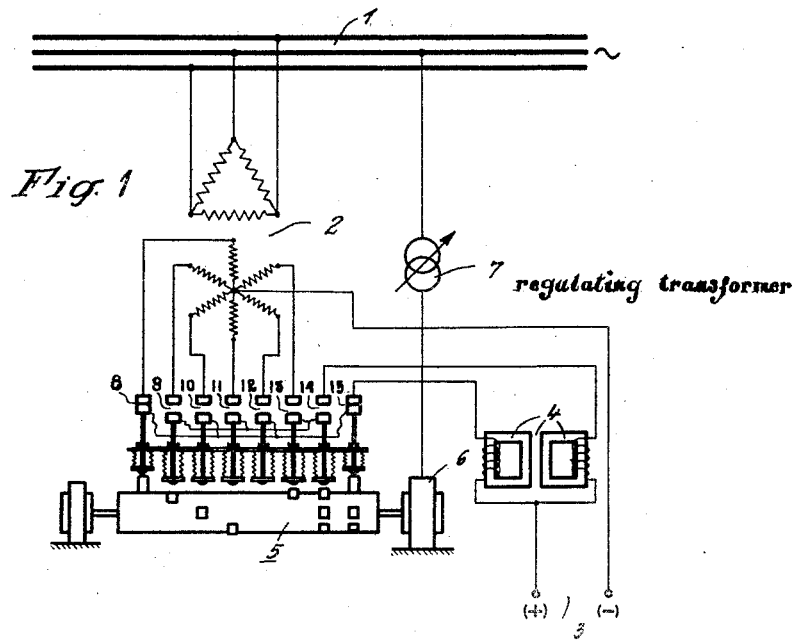

Dec. 27, 1938.    W. LEUKERT    2,141,921

RECTIFIER

Filed March 4, 1937

Inventor
Wilhelm Leukert
by

Patented Dec. 27, 1938

2,141,921

UNITED STATES PATENT OFFICE 2,141,921

RECTIFIER

Wilhelm Leukert, Berlin-Siemensstadt, Germany, assignor to Siemens-Schuckertwerke Aktiengesellschaft, Berlin-Siemensstadt, Germany, a corporation of Germany Application March 4, 1937, Serial No. 128,919
In Germany March 2, 1936

6 Claims. (Cl. 175—364)

My invention relates to rectifiers in which the periodical connection between the alternating-current supply circuit and the direct-current supply circuit and the direct-current consuming device is not established by electric discharge devices with valve effect but by circuit breakers which are actuated in synchronism with the alternating-current supply circuit. It has already been proposed when using such rectifiers to insert between the direct-current supply circuit and the alternating-current supply circuit devices which serve to limit during the rectification the current to be periodically interrupted to such a value as to permit the interruption of the current by circuit breakers. As a current limiting device, a saturated reactor may be employed or a reactor which is equipped with a secondary winding separately excited.

When using such rectifiers for the rectification of polyphase alternating-current voltages, the number of the current limiting devices is chosen according to the invention considerably smaller than the number of the alternating-current phases which are successively rectified during the transmission of energy. According to the invention the number of the current limiting devices is equal to the number of the alternating-current phases which are at most at a given moment involved in the process of rectification. Between the alternating-current phases and the current limiting devices are inserted circuit breaker contacts which are connected to one another, to the alternating-current source and to the current limiting devices in such a manner that the current limiting devices are periodically connected in succession to the different alternating-current phases. Besides these circuit breaker contacts particular auxiliary circuit breakers may be connected in series with the current limiting devices, which auxiliary circuit breakers effect the interruption of the current, whereas the other circuit breaker contacts directly connected to the alternating-current phases serve only as selector switches in order to connect the current limiting devices to the alternating-current phase which is about to be involved in the process of rectification.

The number of the current limiting devices to be inserted between the circuit breakers and the direct-current supply circuit and the direct-current consuming devices depends greatly upon the connection employed for the alternating-current phases feeding the arrangement. In case a normal six-phase star connected transformer is employed for supplying energy to the rectifier, two current limiting devices are, for instance, provided, since at most two of the six phases partake simultaneously in the process of rectification. The number of the required current limiting devices must be greater in case means are provided which introduce additional voltages into the individual phases and which thereby cause an extension of the current supply period in each phase as compared with the ordinary polyphase circuit. This effect may be produced for instance by dissolving the secondary winding of the transformer into two star-connected systems of half the number of phases, which star systems are shifted against one another one half of the phase angle. The star points of such a dissolved system are connected by means of a throttle, the center point of which is provided with a tab. This center tab of the throttle then constitutes the zero point of the transformer winding. With such an arrangement, for instance, if two three-phase star windings are used, a six-phase system is produced, the individual phases of which, however, act with respect to the duration of the current supply as the phases of an ordinary three-phase system. While, however, in ordinary transformer connections, at most—namely during the overlapping period of the phases—two phases simultaneously carry current, in a transformer with a throttle as described hereinabove, or with arrangements which have a similar effect, time periods exist, owing to the extended current supply period in the individual phases, within which more than two phases are able to carry simultaneously.

Figure 2:
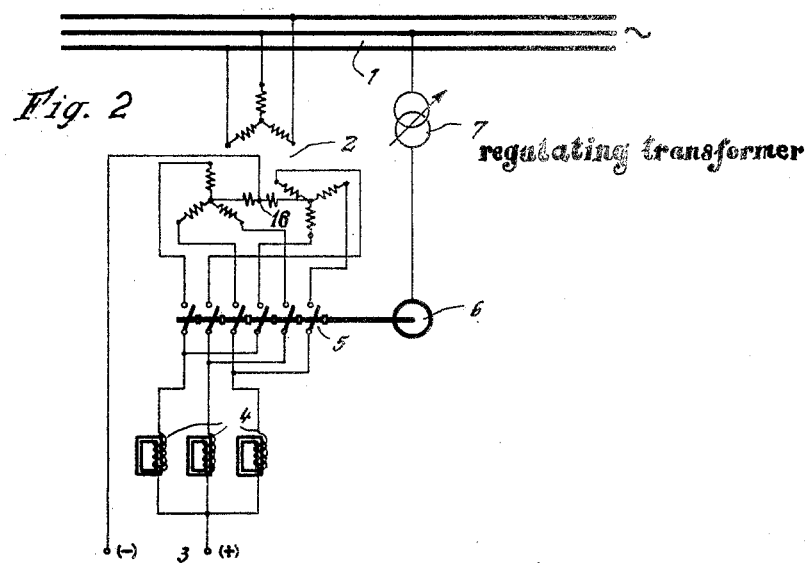

In Figs. 1 and 2 of the accompanying drawing are shown embodiments of my invention in diagrammatic form. In Fig. 1 a transformer 2, whose secondary winding is arranged in six-phase star connection, is connected to an alternating-current supply circuit 1. Between the direct-current supply circuit 3 and the secondary phases of the transformer 2 are inserted two reactors 4, which serve to limit the current, and a switching gear 5 consisting of a plurality of circuit breaker contacts. The two reactors 4 are designed so that they are already saturated at a comparatively small current density and that they distort the current wave to such an extent that the current flowing through them at or near the time of break is so small that it can be interrupted with practically no sparking at the contacts. For any currents above the saturation value, these reactors do not constitute an appreciable impedance for all practical purposes. The switching gear 5 consists of eight individual switches 8–15 designed in the form of cam switches, six switches 8–13 of which are connected to the secondary phases of the transformer 2 and two switches 14 and 15 to both reactors 4. These switches are controlled individually by a cam shaft driven by a synchronous motor 6 whose alternating-current winding is connected to the three-phase current-supply circuit 1 through a regulating transformer 7 for the purpose of properly timing the operation of the switches with the frequency of the supplied alternating current.

This arrangement operates as follows:

In the position of the switch gear shown, contacts 8 and 15 are closed, so that the phase of the transformer secondary winding which is connected to contact 8 is connected by way of the left hand throttle 4 with the direct current system. After a given time period, the next following contact 9 is closed by the switch gear, and at the same time, contact 14, which is electrically connected with contact 9, is closed. Thereby a local closed circuit is formed in which a voltage is effective which is equal to the difference between the voltages of the phases which are connected to contacts 8 and 9. In this local circuit, the two reactors 4 are connected in series. If we assume for the purpose of the present explanation that the current which flows in the direct current circuit is made completely smooth, i. e., that it is without any ripples, the sum of the currents which flow in each instance through the phases which are simultaneously connected in circuit by the contacts 8 and 9 must have a constant value and must be equal to the value of the direct current flowing at that time. The presumption for the correct mode of operation of this arrangement is that the time period at which the phase contact 9 is closed is selected so that the voltage difference effected in that circuit is polarized in such a direction that it tends to produce in the contact 9 a direction of current which coincides with the direction of the direct current.

So long as contact 8 is alone closed, the entire direct current flows over this contact. However, at the instant when contact 9 is closed in addition, a short circuit current develops in the local circuit including the reactor 4, which short circuit current flows first as the only current through contact 9, which latter was formerly without current. This short circuit current, however, flows in the opposite direction from the current which flows in contact 8, and therefore gradually neutralizes and eliminates this latter current. It should be noted, however, that this short circuit current is not generated by any means suddenly, but only gradually owing to the inductance contained in the local short circuit so that the current which flows through contact 8 is gradually diminished to zero, while the current flowing through contact 9 rises within the same time period to the full value of the direct current.

As explained hereinbefore, the reactors 4 are designed so that when the value of a comparatively small current traversing the reactor is exceeded, a value at which the contacts may be safely opened practically without producing sparks, these reactors suddenly attain full saturation beyond which they do not form any appreciable impedance for the current traversing them. Immediately after contact 9 has been closed, the current flowing through this contact is still below the saturation current value of the reactor which is in series with this contact, and therefore this reactor still has its full impedance. The effect of this is that the current flowing through these contacts at first varies only very slowly, until the current flowing through contact 9 exceeds the saturation point of the reactor and thereupon the latter loses its high impedance suddenly down to a very small and negligible value. Thus from this point a very much faster variation of the current flowing through the two contacts becomes possible. After a given time period the current in contact 8 and thus in the right hand reactor coil 4 has dropped far enough below the saturation point of this throttle so that its full inductance comes suddenly into effect. From that moment on, the current variation proceeds again only very slowly and thus the current flowing through contact 8 remains near its zero value for a considerable time period, and thus at a value at which sparkless opening of the contact is still possible.

Within this aforementioned time interval, during which the left hand reactor 4 has its full inductive effect, contact 8 must be opened so that now only contact 9 remains in circuit. Subsequently, contact 10 takes over the function of contact 9 previously described, whereby contact 10 is connected by way of contact 15 with the left hand reactor coil 4. In this manner, contacts 8 through 13 are successively closed, and contacts 14 and 15 are alternately connected with the contacts 8 through 13. During the overlapping period of two phases, respectively during the overlapping of the closing periods of two contacts, both reactors are always connected in circuit and in series with one another in the local circuit produced during this overlapping period.

The particular form of switching gear 5 shown in Fig. 1 is shown only by way of example, and any other conventional form of controlled contact mechanism may be substituted. For instance the break contacts of the circuit breakers inserted between the direct-current supply circuit and the alternating-current transformer may also be designed in another manner; for instance so that the contact connection is established between a brush and a revolving contact as in the case of a commutator. The main point is that the number of the current limiting devices 4 connected in series with the direct-current supply circuit is smaller than the number of the alternating-current phases feeding the rectifier.

Fig. 2 shows another embodiment of my invention. The parts corresponding to Fig. 1 are designated by the same numerals of reference. The difference between the two connections consists in the fact that in Fig. 2 three, instead of two current limiting devices are provided, since the secondary winding of the transformer 2 consists of two star-connected three-phase systems, the star points of which are connected together as mentioned at the beginning by means of a throttle 16, provided with a center tab which leads to one pole of the direct current system so that each of the six phases has a current supply period to the direct current of 120°. In this connection, three alternating-current phases partake temporarily at the same time in the transmission of energy and accordingly three devices for limiting the current to be interrupted by the circuit breaker 5 are provided. The lower contacts of the circuit breaker 5 are connected with one another and with the current limiting devices in such a manner that only those contacts are connected in parallel relation to one another which cannot partake simultaneously in the transmission of energy.

I claim:

1. A converter for exchanging energy between a polyphase alternating current circuit and a direct current circuit, comprising a switching gear having a plurality of contacts arranged to successively connect the phases of the alternating current circuit with successive overlapping of the phase contact periods to the direct current circuit, means for driving said switching gear in synchronism with the alternating current circuit, two variable impedances each series-connected to the direct current circuit and designed to reduce the intensity of the commutating current, means for periodically establishing a local short-circuit comprising the overlapping phases and said impedances in series connection, the time period for closing said local circuit being selected so that the voltage difference between the overlapping phases, prevailing in said circuit, is polarized in the direction of the current in the direct current circuit, and means for selecting for said switch gear the desired phase relation with the alternating current circuit.

2. A converter for exchanging energy between a polyphase alternating current circuit and a direct current circuit, comprising a transformer including a primary winding connected to the alternating current supply circuit and a plurality of secondary windings, each star-connected and shifted in phase with respect to the other secondary winding, a plurality of series-connected inductances inserted between the neutral points of said secondary windings and having their center point directly connected to said direct current circuit, a switching gear having a plurality of contacts arranged to successively connect the phases of said secondary windings with successive overlapping of the phase contact periods to the direct current circuit, means for driving said switching gear in synchronism with the alternating current circuit, a plurality of variable impedances equal in number to the highest number of simultaneously overlapping phases, each impedance being series-connected in the direct current circuit and designed to reduce the intensity of the commutating current which it carries, means for establishing a plurality of local closed circuits, each including in series two phases connected to the direct current circuit and two of said impedances, and means for selecting for the operation of all of said contacts the desired phase relation with the alternating current circuit.

3. A converter for exchanging energy between a polyphase alternating current circuit and a direct current circuit, comprising a plurality of break contacts severally connected to the phases of the alternating current circuit, said contacts being parallel-connected in groups, only such contacts being connected in parallel relation to one another whose corresponding phases do not carry current simultaneously, a number of impedances equal to the number of said groups of break contacts, and designed to reduce the intensity of the commutating current which it carries, each impedance being series-connected in the direct current circuit, and a separate break contact for each of said impedances, means for connecting in succession the phases of the alternating current circuit to the direct current circuit with successive overlapping of the phase contact periods and in synchronism with said alternating current circuit, and means for selecting for the operation of all of said contacts the desired phase relation with the alternating current circuit.

4. A converter for exchanging energy between a polyphase alternating current circuit and a direct current circuit, comprising a switching gear having a plurality of contacts arranged to successively connect the phases of the alternating current circuit with successive overlapping of the phase contact periods to the direct current circuit so as to form temporary short-circuits including the simultaneously closed contacts, means for operating said switching gear in synchronism with said alternating current circuit, a number of variable impedances smaller than the number of phases of said polyphase circuit but at least equal to the number of the simultaneously overlapping phases, said impedances being connected to said switching gear so as to be included in said temporary short-circuits and being designed to reduce the intensity of current flowing through the contacts operated at the time of current flow by said switching gear during an interval including the opening period of said contact, means for periodically connecting each of the impedances to different phases, and means for selecting for said switch gear the desired phase relation with the supplied alternating current.

5. A converter for exchanging energy between a polyphase alternating current circuit and a direct current circuit, comprising a switching gear having a plurality of contacts arranged to successively connect the phases of the alternating current circuit with successive overlapping of the phase contact periods to the direct current circuit so as to form temporary short-circuits including the simultaneously closed contacts, means for operating said switching gear in synchronism with said alternating current supply circuit, a plurality of reactors connected to said switching gear so as to be included in said temporary short-circuits and being designed to be saturated at low intensities of current, means for periodically connecting each of said reactors to a different phase, and means for selecting for said switch gear the desired phase relation with the supplied alternating current.

6. A converter for exchanging energy between a polyphase alternating current circuit and a direct current circuit, comprising a switching gear having a plurality of contacts arranged to successively connect the phases of the alternating current circuit with successive overlapping of the phase contact periods of at least two successive phases to the direct current circuit so as to form temporary short-circuits including the simultaneously closed contacts, means for driving said switching gear in synchronism with said alternating current circuit, a number of variable impedances equal to the number of simultaneously overlapping phases series-connected to the direct current circuit so as to be included in series connection with the simultaneously closed contacts in said temporary short-circuit, said impedances being designed to reduce the intensity of the commutating current, means for establishing a plurality of local closed circuits, each including in series two phases connected to the direct current circuit and two of said impedances, and means for adjusting the desired phase relation of said switch gear with respect to the alternating current circuit.

WILHELM LEUKERT.